(12) United States Patent
Tachibana et al.

(10) Patent No.: US 6,546,987 B1
(45) Date of Patent: Apr. 15, 2003

(54) HEAT SEALING METHOD AND APPARATUS THEREOF

(75) Inventors: Ikuo Tachibana, Settsu (JP); Kiyofumi Inoue, Settsu (JP)

(73) Assignee: Zuiko Corporation, Osaka (JP)

( * ) Notice: Subject to any disclaimer, the term of this patent is extended or adjusted under 35 U.S.C. 154(b) by 0 days.

(21) Appl. No.: 09/674,881

(22) PCT Filed: Mar. 9, 2000

(86) PCT No.: PCT/JP00/01423

§ 371 (c)(1),
(2), (4) Date: Nov. 7, 2000

(87) PCT Pub. No.: WO00/53397

PCT Pub. Date: Sep. 14, 2000

(30) Foreign Application Priority Data

Mar. 9, 1999  (JP) .............................. 11-062275

(51) Int. Cl.[7] .............................................. B32B 31/00
(52) U.S. Cl. ...................... 156/555; 156/582; 156/583.1
(58) Field of Search ................................. 156/555, 580, 156/582, 583.1, 290, 308.2, 308.4

(56) References Cited

U.S. PATENT DOCUMENTS

| 3,854,031 A | 12/1974 | Keller ........................ 219/244 |
| 4,089,729 A | * 5/1978 | Leloux ........................ 156/498 |
| 4,481,876 A | * 11/1984 | Amendola .................... 100/38 |
| 4,816,100 A | 3/1989 | Friese ........................ 156/191 |
| 4,822,437 A | * 4/1989 | Bryniarski et al. .......... 156/252 |
| 5,283,017 A | * 2/1994 | Rohleder et al. ............. 264/25 |
| 5,660,679 A | * 8/1997 | Rajala et al. ............. 156/580.1 |
| 5,817,199 A | * 10/1998 | Brennecke et al. ........ 156/73.1 |
| 5,865,927 A | 2/1999 | Puletti et al. .......... 156/244.11 |

FOREIGN PATENT DOCUMENTS

| DE | 1704041 | 7/1971 |
| EP | 1103367 | 5/2001 |
| JP | 61-091354 | 5/1986 |
| JP | 1-22826 | 9/1989 |
| JP | 4-006010 | 1/1992 |

* cited by examiner

Primary Examiner—James Sells
(74) Attorney, Agent, or Firm—Jordan and Hamburg LLP

(57) ABSTRACT

A method for sealing sheets, the method comprising the steps of passing the sheets through a space between an opposing roller and a first seal roller that is opposingly provided to the opposing roller to seal the sheets and passing the sheets through a space between the opposing roller and a second seal roller that is opposingly provided to the opposing roller to seal the sheets. A heat sealing apparatus comprising a plurality of seal rollers having a plurality of seal blades and an opposing roller oppposingly provided to the plurality of sea rollers, wherein sheets are passed through spaces between the plurality of seal rollers and the opposing roller to be sealed.

12 Claims, 4 Drawing Sheets

HEAT SEALING METHOD AND APPARATUS THEREOF

TECHNICAL FIELD

This invention relates to a heat sealing method and an apparatus for heat sealing thermoplastic materials, such as nonwoven fabric and plastic which are widely used as a medical sanitation material and a packing material.

BACKGROUND ART

The method for heat sealing a thermoplastic material (thermal fusion material) is convenient in the points that it does not require any adhesives and it can form a fused portion with a desired shape. Therefore, it is widely used. The well-known heat sealing methods include bar seal method, sliding nip seal method, belt seal method, and rolling roller method which heat seals the sheet continuously by heating up either a roller or an opposing roller and passing a plurality of belt like sheets, at least one of which is made of a thermoplastic material, through a space between the rollers. A heat seal blade is often attached to the roller. In this instance, sealing portions in a variety of shapes are formed on the thermal fusion sheet following the trace formed by rotations of the heat seal blade provided on the peripheral surface of the roller.

Basically, it is possible to heat seal a thermal fusion material, however, insufficient sealing is often formed when multi-layer materials or thick sheet materials are sealed. Normally, the surface of the sheet contacting with the other sheet to be sealed together (sealing surface) has lower temperature than the surface of the sheet contacting with a heat roller. Therefore, it is particularly difficult to raise the temperature of the sealing surfaces of multi-layer materials or thick sheet materials up to the level sufficient for heat sealing in such a short time that heat sealing has completed by contacting these materials to a heat roller. The productivity decreases as a manufacturing speed decreases if only aimed to attain the temperature level sufficient for heat sealing by increasing a contacting time between the heat roller and the sheet. On the other hand, if the temperature of the heat roller is set higher, undesirable phenomenon such as the surfaces of multi-layer materials or thick sheet materials might be ruptured to have holes or becomes stiff likely occur.

An adaptation of a new method is thought, in which the seal blade is applied to the sealing portion a plurality of times while keeping the temperature of the heat roller in the level which does not adversely affect the surface of multi-layer sheets or thick sheets. The results of the examination conducted by inventors for the present invention, however, show that sealing operations following the first sealing are performed on the part deviates from the first sealing portion when the sheet is sealed continuously by a plurality of heat seal apparatuses (which is equipped with a pair of rollers). If such deviations occur among sealing portions, desired sealing strength cannot be attained and the overall appearance becomes worse due to the expansion in the area of sealed parts.

Therefore, the present invention is made to provide a heat sealing method and an apparatus which can heat seal the same part of the multi-layer sheet material or the thick thermal fusion sheet material a plurality of times to obtain sufficient sealing strength without adversely affecting the surface layer of those materials.

DISCLOSURE OF THE INVENTION

According to an aspect of the present invention, a method for heat sealing a plurality of sheets passing through a space between a seal roller and an opposing roller opposingly provided to the seal roller, the method comprises the step of providing a plurality of seal rollers which are provided with seal blades to the opposite roller and step of sealing the same sealing portion of the sheets at least twice. It becomes probable to heat seal the same sealing portion of the sheet a plurality of times by the adoption of this structure. As a result, sealing can be performed within the temperature range which does not adversely affect the surface layer of the sheet and the sufficient sealing strength can be obtained.

BEST MODE FOR CARRYING OUT THE INVENTION

Figure 1:
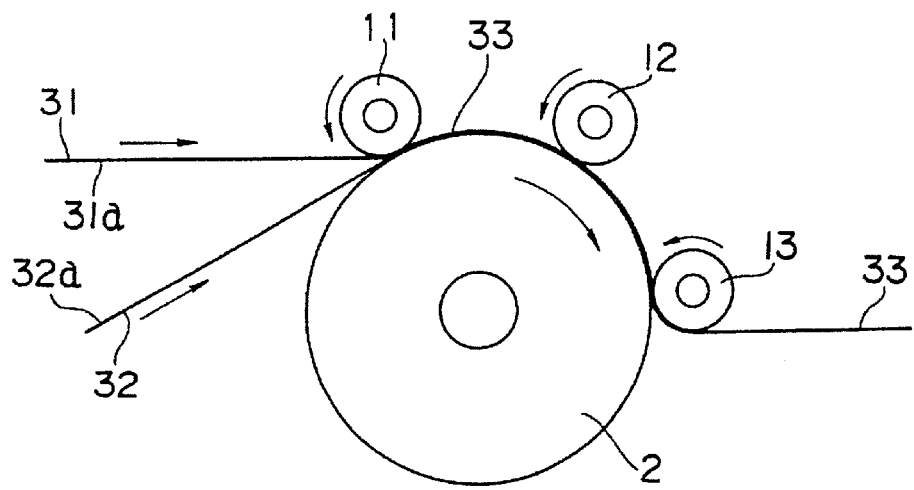
FIG. 1 is an explanatory view of a heat seal apparatus showing an embodiment of the present invention.

A heat sealing method according to a first aspect of the present invention includes heat sealing a plurality of sheets passing through a space between a seal roller and an opposing roller opposingly provided to the seal roller, the method comprising the step of providing a plurality of seal rollers, which are provided with seal blades, to the opposite roller and sealing the same sealing portion of the sheets at least twice. It becomes probable to heat seal the same part of the sheet a plurality of times by the adoption of this structure. With the aforementioned method, the sealing can be performed within the temperature range which does not adversely affect the surface layer of the sheet and sufficient sealing strength can be attained.

The heat sealing method according to a second aspect has a structure opposite to that of the first aspect comprises a plurality of opposing rollers to the seal roller which is provided with a plurality of seal blades and the same effects mentioned above about the first aspect of the present invention be obtained.

The method according to the third aspect is the one dependent from the first two aspects wherein the opposing roller has a sheet holding means. It can prevent the meander of the sheet and can further facilitate the prevention of the position displacement among sealing portions.

An apparatus according to the fourth aspect is the one for performing the heat sealing method recited in the first aspect comprises a plurality of seal rollers having seal blades and an opposing roller being in contact with all the seal rollers. The apparatus according to the the fifth aspect is the one for performing the heat sealing method recited in the second aspect comprises a seal roller having a plurality of seal blades and the opposing rollers, wherein the number of the opposing rollers is the same as the number of the blades of the seal roller. Either one of structures is useful for performing the heat sealing methods recited in the present invention.

The apparatus according to the sixth aspect is the one, wherein the opposing roller or the seal roller includes a sheet holding means. It prevents the position displacement of the sheet and sealing the same part of the sheet becomes much easier.

The apparatus according to the seventh aspect is the one, wherein the sheet holding means is a sheet pushing member which is so constructed as to make contact with or apart from the surface of the roller. By the adoption of the sheet pushing member which can push the sheet only when in need, sealing can be performed on the same portion of the sheet without decreasing the line speed.

The apparatus according to the eighth aspect is the one, wherein an area adjacent to the seal blade of the seal roller is coated with a diamond-like carbon. The apparatus according to the claim 9 is the one, wherein all the periphery surface of the seal roller is coated with a diamond-like carbon. The diamond-like carbon forms such a hard film that it enables the seal blade and the opposing roller, where the seal blade contacts, to be used over longer period of the time.

The invention will be described further in detail hereinafter. Conventionally, a little pulling tension is applied for soft film sheet materials when they are transferred because they are likely to be displaced (meander) in the manufacturing process. If the sheet is soften by heat, the area adjacent to the sealing portion is likely stretched out by the tension force. Moreover, heat shrinkage of the sheet is possibly caused by crystal orientation. Therefore, it is difficult to heat seal the same part of the sheet as the position displacement of sealing portions occurs, even though a plurality of the heat seal apparatuses, each of which has a pair of rollers and a blade of the same shape, are provided and the sheet is passed through the space between the rollers continuously.

According to the present invention, it is adapted a structure comprising either one of a seal roller or an opposing roller being a single in number and the other one of the roller that makes contact with the single roller being plural in number.

As the thermal fusion sheet is sealed a plurality of times while being in contact with any one of the rollers, it can minimize the position displacement.

FIG. 1 is a cross-sectional explanatory view showing a heat seal apparatus 1 comprising three seal rollers (a first seal roller 11, a second seal roller 12, and a third seal roller 13) and an opposing roller 2. Each of the seal rollers 11–13 has an unillustrated heating means, thus the periphery surface of the each seal roller with a seal blade is heated up to the temperature suitable for sealing. It is preferable that the opposing roller 2 also has a heating means and is being heated by the heating means. Moreover, a stick sheath heater, or other heating means such as a high-frequency heating means, an extreme infrared radiation heater, or an oil heater may be provided to the area adjacent to seal rollers 11–13 together with the unillustrated heating means in order to prevent the temperature drops around a protruding blade area during the rotation of the seal rollers 11–13.

The first heat sealing is performed when two continuing sheets 31, 32 are passed through a space between the first seal roller 11 and the opposing roller 2. Then, sheets 31, 32 are integrated into one sheet 33 by the sealing portion. Being in contact with the opposing roller, the sheet 33 is, then, transferred and then the sealing is performed again by the second seal roller 12. The second sealing portion can be matched with the first sealing portion by adjusting peripheral velocity of the first roller, the second roller, the third roller, and the opposing roller. The third sealing is, similarly, performed by the third seal roller 13 on the same sealing portion of the sheet created by the first and the second sealings.

Either the sheet 31 or the sheet 32 may be a thermal fusion material. Each of sheets 31, 32 may be a multi-layer sheet formed by laying a plurality of sheets one over the other. In this instance, a thermal fusion material needs to be provided on the sealing surface 31a of the sheet 31 or on the sealing surface 32a of the sheet 32. If a plurality of sealings are performed by a plurality of heat seal apparatuses, each of which comprises a pair of rollers, the meander likely takes place when the sheet is transferred along a passage between the apparatuses. In the present invention, however, the meander can be prevented and the same part of the sheet is sealed because thrice sealings are performed in such a condition that the sheet 33 is maintained in contact with the opposing roller 2.

It is preferable that the opposing roller 2 has a sheet holding means in order to prevent the meander further and to perform a plurality of sealings on the same portion of the sheet. As a sheet holding means, ① air suction apertures, ② a frictional resistance increasing (decreasing) means, and ③ a sheet pushing member can be used. If any one of sheet holding means mentioned above is used together with the other(s), the meander of a single layer sheet can be prevented even more. These sheet holing means will be explained in detail hereinafter.

① Air suction apertures

Air suction apertures are provided on the peripheral surface of the opposing roller 2, except for the sealing portion (the part where the blade of the seal roller contacts with the opposing roller via the sheet), and the width of the area where air suction apertures are provide on the periphery surface of the opposing roller is substantially the same as the width of the sheet 32. In that embodiment, the sealed sheet 33 is transferred along the passage in the apparatus while being held by the air suction. Thus, the first sealing, the second sealing, and the third sealing are performed on the same part of the sheet as the displacement of the sheet 33 is prevented. It is easy to hold the sheet by the air suction if the sheet 31 or the sheet 32 is made of a gas impermissible material, however, it is often difficult to hold the sheet by simply adjusting such elements as wind force, wind pressure, and so on if the sheet is made of a gas permissible material, such as nonwoven fabric.

② frictional resistance increasing (decreasing) means

If the sheet 32 is made of a gas permissible material, such as nonwoven fabric, the sealed sheet 33 tends to be stretched out in the transferring (moving) direction in accordance with the tension applied to it and the sheet 33 becomes narrower in the width direction even though the sheet 33 is transferred while being in contact with the roller (the seal roller 11, the seal roller 12, the seal roller 13, or the opposing roller 2). Thus, the position displacement of sealing is caused. It is preferable to increase the frictional resistance of the roller surface in order not to cause the displacement of the sheet. On the other hand, if the frictional resistance of the roller surface is too large, nonwoven fabric formed by long thin fibers winds around the roller as it is easy to become shaggy when nonwoven fabric is used as a sheet. In this case the frictional resistance of the roller surface needs to be decreased to let the sheet 33 easily come off from the roller. The frictional resistance increasing materials such as rubber, urethane or the frictional resistance decreasing materials such as Teflon, MC nylon, and variety of silicon materials are inserted into the roller or the roller surface is coated with such materials for adjusting the frictional resistance of the roller surface. The roughness of the roller surface can also be adjusted by the treatment such as thermal spraying, and the shot-blasting and so on. Combination of a plurality of treatments mentioned above may be used.

③ A sheet pushing member

Figure 2:
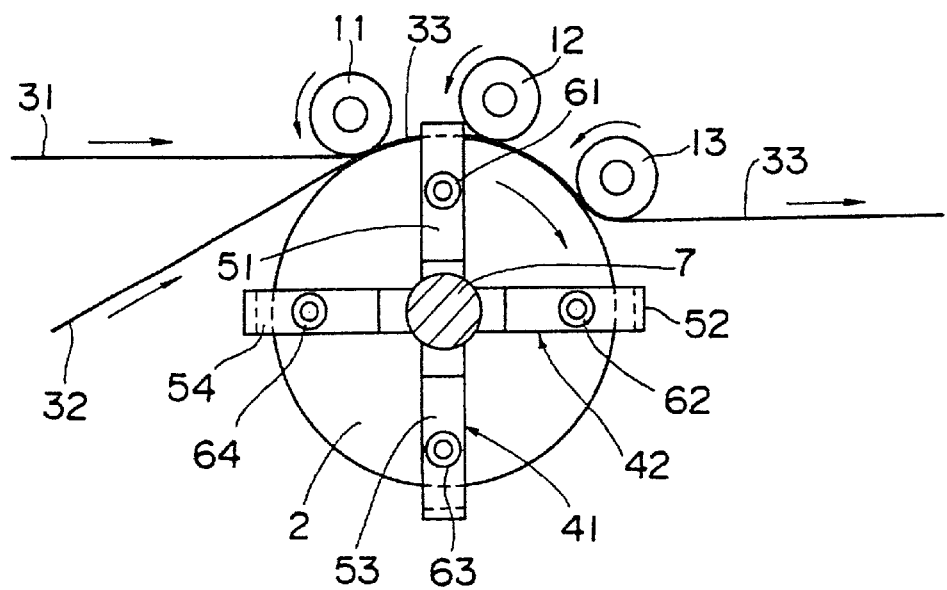
FIG. 2 is an explanatory view showing a structure of a sheet pushing member of the present invention.
Figure 3:
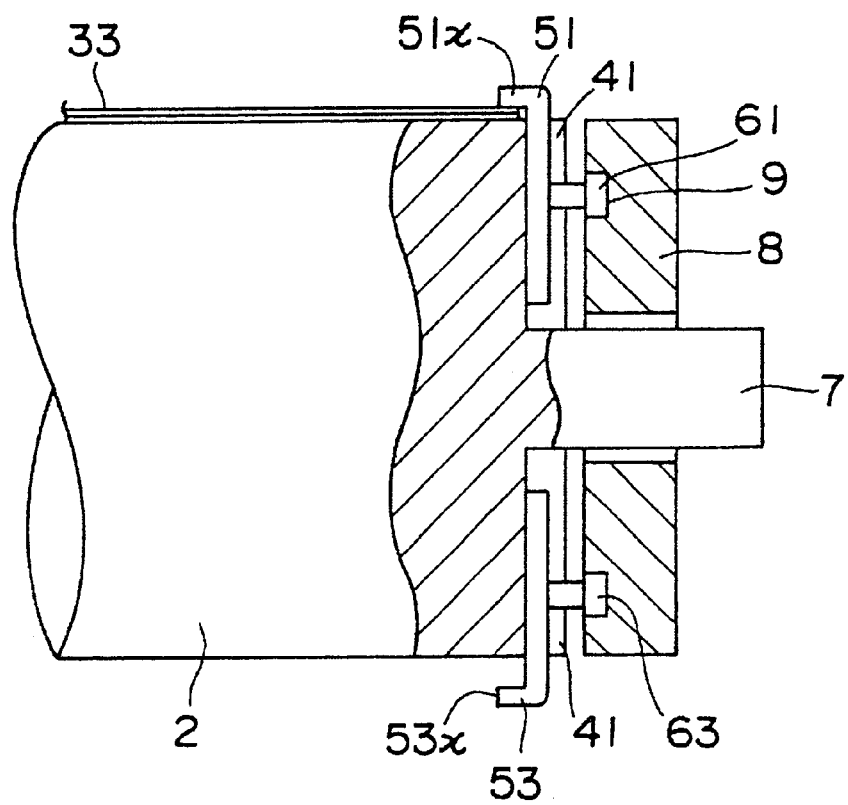
FIG. 3 is a cross-sectional partial view showing the structure of the sheet pushing members of the present invention.

A sheet pushing member is for pushing the sheet 33 against the opposing roller surface. Considering the continuous sealing, the sheet pushing member needs to be provided in such a manner that it can push and release the sheet. In other words, it is needed that the sheet pushing member can be contactable to and released from the sheet. For example, cruciate grooves 41, 42 extending in the radial direction are formed on a side surfaces of the roller and sheet pushing members 51, 53 being slidable along the groove 41 and sheet pushing members 52, 54 being slidable along the groove 42 are provided as shown in FIG. 2 and FIG. 3. The sheet pushing members 51–54 rotate together with the opposing roller 2. On the other hand, cam followers 61, 62, 63, 64 are provided on the sheet pushing members 51, 52, 53, 54, respectively.

As the lead end portion 51x of the sheet pushing member 51 is formed by the material having large frictional resistance, such as rubber, the sheet is securely held. The cam follower 61 connecting to the sheet pushing member 51 and the cam follower 53 connecting to the sheet pushing member 53 are provided in such a way that they are fit into the guide groove 9 of the guide plate 8 which is independent from the opposing roller. Thus, the cam follower 61 and the cam follower 63 can slide along the groove 9. The cam follower 62 and the cam follower 64 which are not shown in FIG. 3 are also constructed in the same manner.

Figure 4:
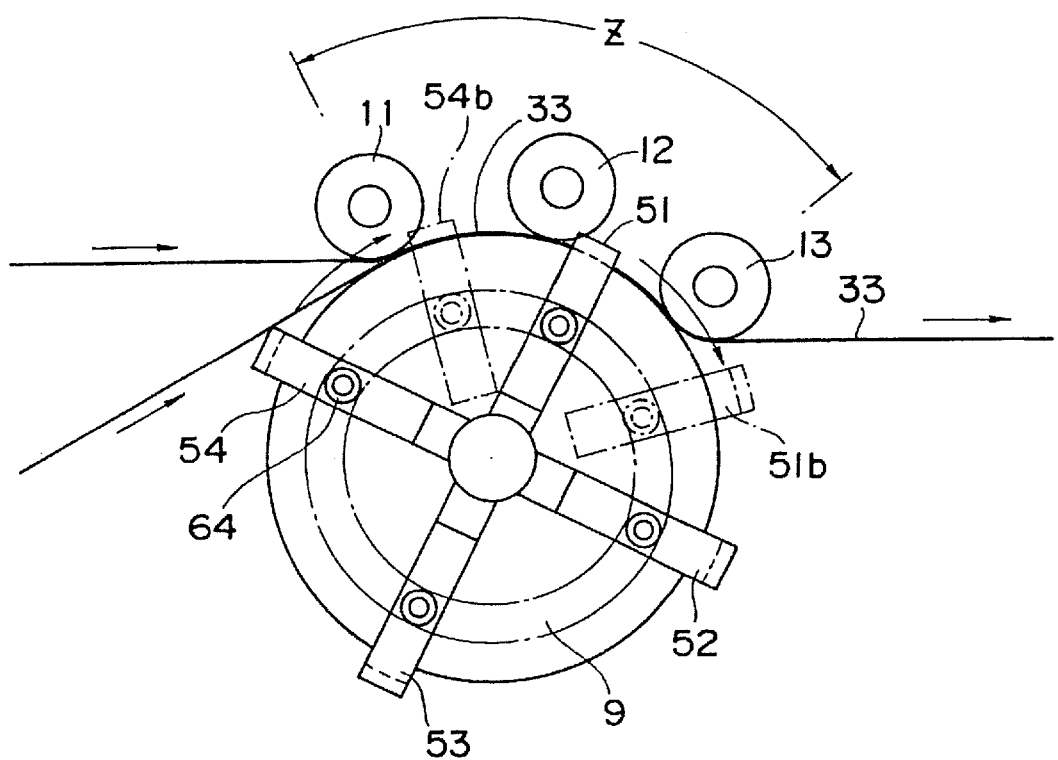
FIG. 4 is an explanatory view showing the movement of the sheet pushing members.
Figure 5:
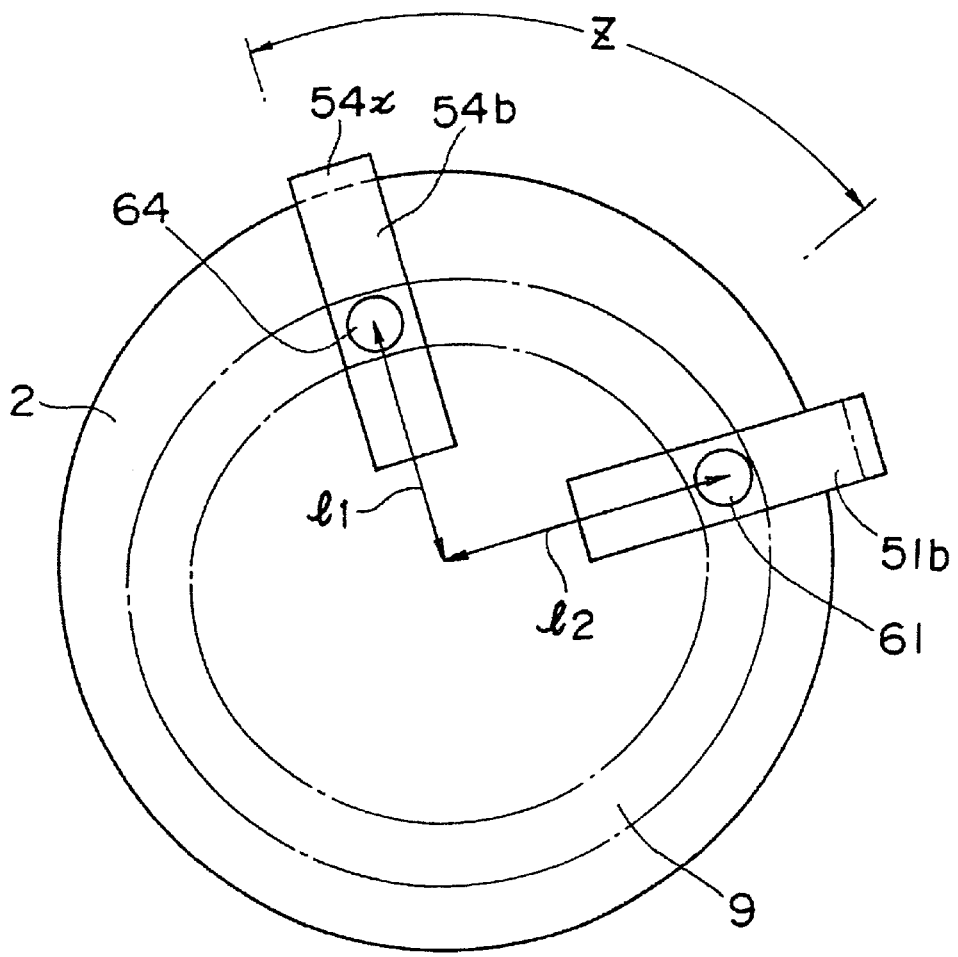
FIG. 5 is an explanatory view showing the movement of the sheet pushing members.

FIG. 4 and FIG. 5 are explanatory views showing the movements of the guide 9, the cam flowers, and the sheet pushing members. As shown in FIG. 5, the guide 9 draws a circular arc tracing having a distance from a shaft center $I_1$ which is shorter than $I_2$ in the Z zone although it draws a circular arc tracing having a distance from a shaft center $I_2$ in about two-thirds of the entire circuit of the roller. Although the lead end of the sheet pushing member 54 shown in FIG. 4 is apart from the periphery surface of the opposing roller 2, the sheet pushing member 54b makes a sliding displacement as if it approaches to the axial center when the cam follower 64 slides along the guide groove 9 to get into the Z zone and reaches the place shown by a phantom line (the sheet pushing member 54b). As a result, the lead end 54x of the sheet pushing member 54b is pushed to contact with the periphery surface of the opposing roller 2 and it comes to push the sheet against the roller surface as it is also shown in FIG. 5. The sheet pushing member 51 displaces its position from the position contacting with roller surface to the position being apart from the roller (51b) while the sheet pushing member 54 performing the movement mentioned above.

It is preferable that the Z zone as shown in FIG. 4 starts at the point where the first sealing is performed by the seal roller 11 and finishes at the point where the sheet 33 is introduced into the space between the seal roller 13 and the opposing roller 2. According to this embodiment, it becomes possible to perform a plurality of sealings on the same part of the sheet because the second sealing and/or the third sealing can be performed while securely holding the sheet to which the first sealing was performed.

The shape of the guide groove 9 can be changeable according to the number of the seal rollers and the setting position of them. A solenoid actuator or an air cylinder can be used as a drive means in order to make the sheet pushing member contact with and apart from the opposing roller.

The seal rollers and the opposing roller described in FIG. 1 can be interchangeable (the structure recited in claim 1 and claim 5). In other words, a heat seal apparatus comprises three opposing rollers (11, 12, 13) and a seal roller. According to this embodiment, three seal blades are formed on certain parts of the seal roller 2 surface where each opposing roller contacts with the seal roller via the sheet. The peripheral velocity of each roller may be adjusted. It is desirable to provide a sheet holding means on the seal roller.

The number of one of the rollers (the seal roller or the opposing roller) which is a plural in number is not limited to three as shown in FIG. 1, it, therefore, allows to alter a design as desired. Heat sealing condition for obtaining a sufficient sealing strength may be changed in accordance with the seal blade shape (sealing area), the sheet material, the number of sheet and so on. For example, when two polyolefine sheets containing at least 60 weight % of polyolefine are joined by the linear sealing, the sufficient sealing strength can be obtained by pressurizing them by 20–60 kg/mm with the temperature of 80° C. or over. Thus as the aforementioned heat sealing condition as a reference, the sealing condition can be changed. The method, which changes the peripheral velocity of the roller while keeping the rotation speed of the roller constant, can be also adopted by displacing an axial center of the seal roller or the opposing roller to change the sealing time.

In the heat seal apparatus of the present invention the area adjacent to the seal blade of the seal roller and all the periphery surface of the opposing roller are coated with a diamond-like carbon so that the wearing of the roller is prevented and the rollers can be used over a longer period.

The area adjacent to the seal blade at least includes the lead end of the seal blade. All the dimensions of the seal blade or all the periphery surface of the seal roller including the area where the seal blade protrudes may be coated with the diamond-like carbon because the blade normally protrudes from the periphery surface of the seal roller by approximately 1–20 mm. It is preferable that all the periphery surface of the opposing roller is coated with the diamond-like carbon to allow the seal blade to contact any part of the periphery surface of it.

The diamond-like carbon produced by colliding carbon ions over a base plate, is a hard carbon membrane like diamond, however, it does not show crystalline. The plasma CVD method may be adopted to coat the diamond-like carbon having the characteristics mentioned above. If the diamond-like carbon coating layer is worn out due to the repetitive usages over a long period of the time, it can be recoated after striping the diamond-like carbon layer coated with the periphery surface of the cutting blade. Stainless steel, a variety of alloys, alumina, and ceramics can be used for the seal blade or the opposing roller.

Comparing with the manufacturing cost of the seal roller by the use of a super hard alloy, the manufacturing cost of the seal roller by the use of the diamond-like carbon can be reduced to less than one-third.

Industrial Applicability

As the heat sealing method and the apparatus of the present invention are constructed in such a way that they can seal the same part of the sheet a plurality of times, high speed heat sealing of the multi-sheet or the thick sheet can be performed without damaging the surface layer of the sheet due to overheating. The construction of the heat seal apparatus having a sheet holding means can prevent the meander of the sheet and makes it possible to perform sealings following the first sealing, while pressing the sheet, on which the first sealing is performed, against the roller.

According to the other embodiment where the diamond-like carbon is coated with the area adjacent to the heat seal blade or the periphery surface of the opposing roller, the wear of the seal blade or the opposing roller is reduced significantly.

What is claimed is:

1. A heat sealing apparatus comprising:
   a plurality of roller sealers having a plurality of seal members, and
   an opposing roller opposingly provided to the plurality of seal rollers,
   wherein sheets are passed through spaces between the plurality of seal rollers and the opposing roller to be sealed.

2. A heat sealing apparatus comprising:
   a seal roller having a plurality of seal members, and
   a plurality of opposing rollers provided to the seal roller,
   wherein sheets are passed through spaces between the seal roller and the plurality of opposing rollers to be sealed.

3. The heat sealing apparatus according to claim 1, wherein the opposing roller includes a sheet holding unit for preventing the sheets from meandering.

4. The heat sealing apparatus according to claim 2, wherein the seal roller includes a sheet holding unit for preventing the sheets from meandering.

5. The heat sealing apparatus according to claim 1, wherein the opposing roller includes a sheet pushing member for pushing the sheets against the opposing roller.

6. The heat sealing apparatus according to claim 2, wherein the seal roller includes a sheet pushing member for pushing the sheets against the seal roller.

7. The heat sealing apparatus according to claim 1, wherein an area adjacent to the plurality of seal members is coated with a diamond-like carbon.

8. The heat sealing apparatus according to claim 2, wherein in an area adjacent to the plurality of seal members is coated with a diamond-like carbon.

9. The heat sealing apparatus according to claim 1, wherein the opposing roller is coated with a diamond-like carbon.

10. The heat sealing apparatus according to claim 2, wherein the plurality of opposing rollers are coated with a diamond-like carbon.

11. The heat sealing apparatus according to claim 1, wherein one of the sheets is a thermal fusion material.

12. The heat sealing apparatus according to claim 2, wherein one of the sheets is a thermal fusion material.

* * * * *